A
United States Patent Office 3,480,714
Patented Nov. 25, 1969

3,480,714
N-SUBSTITUTED ISOQUINOLINES AS ANTIPROTOZOAL AGENTS
Lincoln Harvey Werner, Summit, N.J., assignor to Ciba Corporation, New York, N.Y., a corporation of Delaware
No Drawing. Filed Feb. 7, 1966, Ser. No. 525,312
Int. Cl. A01n 9/22
U.S. Cl. 424—258      2 Claims

ABSTRACT OF THE DISCLOSURE

N-(3,4 1dihydro- and 1,2,3,4-tetrahyro-2-isoquinolyl-alkyl and -alkanoyl)-N-arylamines of the formula

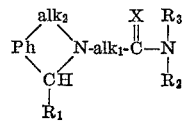

Ph=a 1,2-phenylene
$alk_{1,2}$=alkylene
$X=H_2$, O, S
$R_2=H$, alkyl, alkanoyl
$R_3$=iso- or heterocyclic aryl N-oxides, quaternaries and salts thereof exhibit antiprotozoal, especially antileptospiral, effects.

---

The present invention concerns and has for its object the provision of N-(3,4-dihydro- and 1,2,3,4-tetrahydro-2-isoquinolyl- alkyl and -alkanoyl)-N-arylamines and methods for their preparation.

More particularly, it relates to compounds of the Formula I

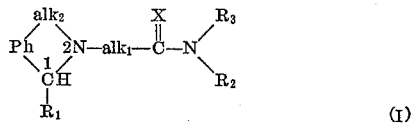

in which Ph stands for a 1,2-phenylene radical, $R_1$ for hydrogen or lower alkyl, $R_2$ for hydrogen, lower alkyl or alkanoyl, $R_3$ for an aryl radical, X for two hydrogens, oxo or thio, each of $alk_1$ and $alk_2$ for lower alkylene, the latter of which separating the phenylene radical Ph from the nitrogen atom by two ring-carbon atoms, N-oxides, quaternaries and 1,2-dehydro-quaternaries thereof and salts of these compounds.

The 1,2-phenylene radical Ph is unsubstituted or substituted by one or more than one of the same or different substituents attached to any of the positions available for substitution. Such substituents are, for example, lower alkyl, such as methyl, ethyl, n- or i-propyl, n-, i-, sec. or tert. -butyl, etherified or esterified hydroxy or mercapto, for example, lower alkoxy, alkylenedioxy or alkylmercapto, such as methoxy, ethoxy, n- or i-propoxy or n-butoxy, methylenedioxy, 1,1- or 1,2-ethylenedioxy, methyl- or ethylmercapto, or halogen, such as fluoro, chloro, or bromo, trifluoromethyl, nitro or amino, such as di-lower alkylamino, e.g. dimethylamino or diethylamino.

A lower alkyl radical $R_1$ and/or $R_2$ is, for example, one of those mentioned above, but also straight or branched pentyl, hexyl or heptyl bound in any position, $R_1$ preferably stands for alkyl with up to 4 carbon atoms and $R_2$ for hydrogen, but also for lower alkanoyl, such as acetyl, propionyl, butyryl or pivalyl.

The aryl radical $R_3$ is, for example, carbocyclic or heterocyclic mono- or bicyclic aryl, such as phenyl, naphthyl, tienyl, furyl, pyridyl, quinolyl or isoquinolyl. It preferably stands for unsubstituted or substituted phenyl, which latter may contain one or more than one of the same or different substituents, such as those mentioned for the phenylene radical Ph.

The lower alkylene group $alk_1$ is preferably methylene, but also, 1,1- or 1,2-ethylene, 1,1-, 1,2-, 2,2- or 1,3-propylene, 1,1-, 1,2-, 2,2-, 1,3- or 1,4-butylene, 2-methyl-1,3-propylene, 2,3-, 2,4- or 1,5-pentylene, 1,4-hexylene or 2,6-heptylene. The alkylene group $alk_2$ is preferably 1,2-ethylene but also 1,2-propylene, 1,2- or 2,3-butylene, 1,2- or 2,3-pentylene, 1,2-, 2,3- or 3,4-hexylene or 3,4-heptylene.

The compounds of the invention exhibit valuable pharmacological properties. Apart from adrenolytic effects, they show primarily a specific effect against protozoa, particularly Leptospira, such as *Lept. pomona*, canicola or icterohemorrhagiae, as can be demonstrated in vitro and in animal tests using, for example, dogs and hamsters as test objects. They are, therefore, useful agents against leptospirosis or as adjuvants in the management of hypertension. Furthermore, they can be used as intermediates for the preparation of other useful products, preferably of pharmacologically active compounds.

Particularly useful are compounds of the Formula II

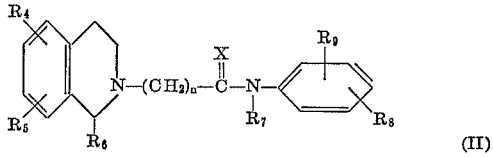

in which each of $R_4$, $R_5$, $R_8$ and $R_9$ stands for hydrogen, lower alkyl, lower alkoxy, halogen or trifluoromethyl, each of $R_6$ and $R_7$ for hydrogen or lower alkyl, X for oxo or thio and n for an integer from 1 to 3, their acid addition salts and 1,2-dehydroquaternaries.

Compounds that are especially valuable are those of the Formula III

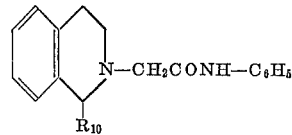

in which $R_{10}$ stands for alkyl with up to 4 carbon atoms, their therapeutically acceptable acid addition salts and quaternary 1,2-dehydro halides which, when given to hamsters subcutaneously at doses between about 1 to 10 mg./kg., or orally between about 10 and 75 mg./kg., show outstanding antileptospira activity.

The compounds of the invention are prepared by methods in themselves known, for example, the process consists in:

(a) Reacting a 2-unsubstituted 3,4-dihydro- or 1,2,3,4-tetrahydro-isoquinoline with a reactive ester of an N-hydroxyalkyl or -alkanoyl-N-arylamine or a corresponding epoxide or (b) Reacting a reactive derivative of a (3,4-dihydro- or 1,2,3,4-tetrahydro-2-isoquinolyl)-alkanol or -alkanoic acid with a primary or secondary arylamine or (c) Reducing in an N-(3,4-dihydro- or 1,2,3,4-tetrahydro-2-isoquinolyl-alkyl or -alkanoyl)-N-arylamine containing adjacent to the ring-nitrogen atom at least one carbonyl group, said group to the methylene group or (d) Condensing a reactive ester of a 1-(β-hydroxyalkyl)-2-(α-hydroxy-or oxo-alkyl)-benzene with a primary N-aminoalkyl- or -alkanoyl-N-arylamine or (e) Ring-closing a 1-(α-hydroxyalkyl)-2-(β-arylamino- or arylcarbamylalkylamino-alkyl)-benzene or 1-(β-hydroxyalkyl)-2-(α-arylamino- or arylcarbamylamino-alkyl)-benzene, or a reactive ester thereof and, if desired, converting a resulting compound into another compound of the invention.

A reactive ester of the alcohol mentioned under items (a), (b), (d) and (e) is, for example, that of a hydrohalic or sulfonic acid, such as hydrochloric, hydrobromic, methane-, ethane-, benzene- or p-toluenesulfonic acid. A reactive derivative of the alkanoic acid used in reaction (b) is, for example, a halide, e.g. chloride or bromide, an anhydride, e.g. the adducts of ketenes, an ester, such as a lower alkyl or aralkyl ester or the N-unsubstituted amide. Said reactive esters are advantageously used in the presence of basic condensing agents, such as alkali or alkaline earth metal carbonates or bicarbonates or tertiary nitrogen bases, such as triethylamine, N,N-dimethyl-aniline or pyridine. Epoxides may advantageously be reacted in the presence of small amounts of water and/or acids, e.g. hydrochloric acid, which catalysts are also useful in the amidation of the acid anhydrides, esters and amides.

The reduction according to item (c) is carried out, for example, with the use of complex light metal hydrides, such as lithium aluminum hydride, or with hydrogen, e.g. under electrolytic conditions.

The condensation mentioned under item (d) may be carried out in one or two steps, in the latter instance compounds mentioned under item (e) are obtained. In case they are reactive esters, the reaction conditions are analogous to those mentioned above. Free hydroxyalkyl compounds are advantageously ring-closed in the presence of dehydrating agents, such as sulfuric or polyphosphoric acid or carbodiimides.

The compounds of the invention so obtained may be converted into each other by methods in themselves known. Thus, for example, a compound unsaturated in the 1,2-positions may be hydrogenated with catalytically activated or nascent hydrogen, such as hydrogen in the presence of platinum, palladium or nickel catalysts, or hydrogen generated by an alkali metal in an alcohol by electrolysis or with the use of complex light metal hydrides such as sodium borohydride. Amides or thioamides obtained may be reduced according to the method shown under item (c). Secondary amines or monosubstituted amides may be reacted with reactive esters of lower alkanols, regular amides may be converted into thioamides, for example, by reaction with a phosphorus sulfide, and secondary amines acylated with reactive derivatives of lower alkanoic acids, e.g. those mentioned above.

The N-oxides of the invention are obtained, for example, by reacting the free bases with hydrogen peroxide or a peracid, e.g. peracetic, perbenzoic or monoperphthalic acid. Quaternaries are formed by reaction of the bases with a reactive ester of an alcohol, preferably that of a lower alkanol with a hydrohalic acid.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can be used also for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly those starting materials should be used in the reactions of the invention that lead to the formation of those compounds indicated above as being specially valuable.

The starting materials are known, or if they are new, may be prepared by methods in themselves known. Those mentioned under items (a), (b) and (c) may be prepared as shown in J. Chem. Soc. 1951, 3464, Gazz. chim. ital. 84, 908 (1954) and Chem. Ber. 95, 2122 (1962). The starting material mentioned under item (d) can be obtained by reaction of a 2-(1-alkenyl)-phenylmagnesium halide with an alkanal and, if desired, Oppenauer-oxydation of the α-hydroxylalkyl compound obtained, and addition of water or a hydrogen halide to the resulting 1-(1-alkenyl)-2-(α-hydroxy- or oxoalkyl)-benzene, the latter advantageously in the presence of peroxides. Hydroxy compounds so obtained may be esterified, for example, with the use of thionylhalides or sulfonic acid halides. Resulting 1-(β-haloalkyl)-2-(α-hydroxyalkyl)-benzenes or 1-(β-haloalkyl)-2-(α-haloalkyl)-benzenes may be reacted with an arylamino- or arylcarbamyl-alkylamine, in order to obtain the compounds mentioned under item (e).

Starting materials or final products that are mixtures of isomers may be separated into simple isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the stereoisomeric pure racemates (diastereoisomers), for example, by chromatography and/or fractional crystallization. Racemic products can likewise be resolved into the optical antipodes, for example, by reaction with optically active acids, separation of the diastereomeric salts and liberation of the bases from the salts.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral but also for perenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They may further contain other therapeutically valuable substances. The pharmaceutical preparations are prepared by conventional methods.

The following examples illustrate the invention; temperatures are given in centigrade and all parts wherever given are parts by weight.

EXAMPLE 1

To the solution of 12.6 g. 1-methyl-3,4-dihydro-isoquinoline in 30 ml. acetone the solution of 14.6 g. N-phenylchloracetamide in 70 ml. acetone is added and the mixture refluxed for ½ hour. It is then evaporated in vacuo and the residue recrystallized from isopropanol to yield some unreacted N-phenylchloracetamide which is discarded. The mother liquor is concentrated, the residue dissolved in hot water, the solution filtered and to the filtrate an aqueous solution of potassium iodide is added. The precipitate formed is filtered off, recrystallized from ethanol to yield the 1-methyl-2-(N-phenylcarbamyl-methyl)-3,4-dihydro-isoquinolinium iodide of the formula

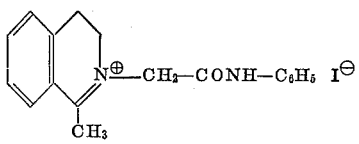

melting at 227–230°.

The starting material is prepared as follows: 15.0 g. 1-methyl-3,4-dihydro-isoquinoline hydrochloride are dissolved in 30 ml. water, the solution neutralized with sodium carbonate and extracted with 100 ml. diethyl ether. The extract is dried, filtered and evaporated to yield the corresponding free base.

EXAMPLE 2

To the hot solution of 1.0 g. 1-methyl-2-(N-phenylcarbamyl-methyl)-3,4-dihydro-isoquinolinium iodide in 20 ml. methanol 0.4 g. sodium borohydride are added in portions and the reaction mixture is allowed to stand at room temperature for one hour. It is then concentrated in vacuo, to the residue 20 ml. diethyl ether and 5 ml. water are added, the ethereal solution separated, dried, filtered and the filtrate acidified with a solution of hydrogen chloride in ethyl acetate. The precipitate formed is filtered off and dried. 0.7 g. thereof are dissolved in water, the solution neutralized with potassium carbonate, extracted with diethyl ether, the extract dried, filtered and evaporated. The residual base is taken up in diethyl ether, the solution acidified with hydrogen chloride in ethyl acetate, the precipitate filtered off and recrystallized from isopropanol-acetone to yield the 1-methyl-2-(N-phenylcarbamyl-methyl)-1,2,3,4-tetrahydro-isoquinoline hydrochloride of the formula

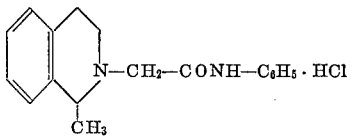

melting at 184–187°.

EXAMPLE 3

8.0 g. 1-methyl-2-(N-phenylcarbamyl-methyl)-1,2,3,4-tetrahydro-isoquinoline are dissolved in 50 ml. diethyl ether and the solution added dropwise to the stirred suspension of 3.42 g. lithium aluminum hydride in 150 ml. diethyl ether. The mixture is stirred at room tempertaure for 16 hours; hereupon 5.12 ml. ethyl acetate, 1.6 ml. water, 3.42 ml. 15% aqueous sodium hydroxide and 5.12 ml. water are added in this order and the whole is filtered. The filtrate is dried, evaporated in vacuo, the residue dissolved in 100 ml. diethyl ether and the solution acidified with hydrogen chloride in ethyl acetate. The precipitate formed is filtered off and recrystallized from ethanol to yield the 1-methyl-2-(2-phenylamino-ethyl)-1,2,3,4-tetrahydro-isoquinoline hydrochloride of the formula

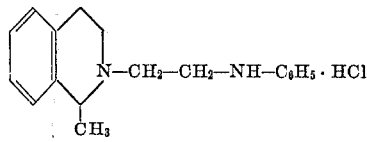

melting at 235–237°.

EXAMPLE 4

3.6 g. 1-methyl-2-(2-phenylamino-ethyl)-1,2,3,4-tetrahydro-isoquinoline are dissolved in 20 ml. benzene and the solution combined with that of 2.0 g. propionic acid anhydride in 20 ml. benzene. The reaction mixture is refluxed for one hour with stirring and then evaporated in vacuo. The residue is dissolved in diethyl ether and the solution acidified with hydrogen chloride in ethyl acetate to yield the very hygroscopic 1-methyl-2-(2-N-phenyl-N-propionylamino-ethyl)-1,2,3,4-tetrahydro-isoquinoline hydrochloride of the formula

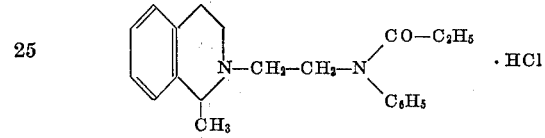

It analyzes as follows: Theory: C=66.91%, H=7.75%, N=7.42%. Found: C=66.76%, H=8.09%, N=7.40%.

EXAMPLE 5

Preparation of 20,000 tablets each containing 0.4 g. of the active ingredient.

| Material: | G. |
| --- | --- |
| 1-methyl-2-(N-phenylcarbamyl-methyl)-3,4-dihydro-isoquinolinium iodide | 4,000 |
| Gelatine | 300 |
| Corn starch (anhydrous) | 3,318 |
| Talcum | 1,250 |
| Stearic acid | 132 |
| Purified water, q.s. | |

Procedure

The iodide and 1,452 g. of the starch are passed through a 16 mesh screen and mixed thoroughly. The gelatine is dissolved in 2,000 ml. water, the solution combined with a suspension of 616 g. starch in 400 ml. cold water and the whole heated on a water bath until a paste is formed. It is combined with the sieved powders using additional water, if necessary. The granulate is passed through a 5 mesh screen, dried at 49° and broken on a 9 mesh screen in the Fitzpatrick mill, knives forward. The granules are mixed with the talcum, stearic acid and the remaining starch and the mixture compressed into tablets using standard concave punches scored and monogrammed.

EXAMPLE 6

The compounds of the invention are useful in the veterinary field, for example, in the form of pharmaceutical preparations, feedstuffs or additives to the feed or drinking water.

Feedstuff additive containing 10% of the active ingredient.

| | G. |
| --- | --- |
| 1-methyl-2-(N-phenylcarbamyl-methyl)-3,4-dihydro-isoquinolinium iodide | 100 |
| Medicinal carbon | 100 |
| Glucose | 800 |

The thoroughly mixed additive is incorporated in the feed concerned, in an amount such as to achieve a concentration therein of about 0.1 to 50 g., preferably about 1 g. per ton of the feed.

What is claimed is:

1. A pharmaceutical composition comprising an antiprotozoal effective amount of a compound of the formula

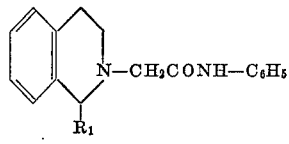

in which $R_{10}$ stands for alkyl with up to 4 carbon atoms, a therapeutically acceptable acid addition salt or a 1,2-dehydro halide thereof, together with a pharmaceutical excipient.

2. A feedstuff additive comprising a feedstuff additive and an antiprotozoal effective amount of a compound of the formula

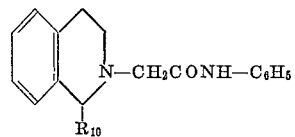

in which $R_{10}$ stands for alkyl with up to 4 carbon atoms, a therapeutically acceptable acid addition salt or a 1,2-dehydro halide thereof.

References Cited

UNITED STATES PATENTS 2,778,834  1/1959  Bruce _____ 260—287

ALBERT T. MEYERS, Primary Examiner

J. D. GOLDBERG, Assistant Examiner

CASE SU-462

PO-1050
(5/69)

UNITED STATES PATENT OFFICE
CERTIFICATE OF CORRECTION

Patent No. 3,480,714     Dated November 25, 1969

Inventor(s) LINCOLN HARVEY WERNER

It is certified that error appears in the above-identified patent and that said Letters Patent are hereby corrected as shown below:

Column 7, line 10, in the formula

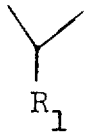    should be    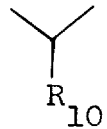

Signed and sealed NOV 17 1970

(SEAL)
Attest:

Edward M. Fletcher, Jr.
Attesting Officer

WILLIAM E. SCHUYLER, JR.
Commissioner of Patents